(12) United States Patent
Philip et al.

(10) Patent No.: US 12,321,463 B2
(45) Date of Patent: Jun. 3, 2025

(54) SECURITY VULNERABILITY DETECTION FOR IMAGE FILES

(71) Applicant: Bank of America Corporation, Charlotte, NC (US)

(72) Inventors: Charles C. Philip, Mumbai (IN); Tejshree Suresh, Kerala (IN); Ilma Siddiqui, Madhya Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 365 days.

(21) Appl. No.: 18/109,409

(22) Filed: Feb. 14, 2023

(65) Prior Publication Data
US 2024/0273212 A1    Aug. 15, 2024

(51) Int. Cl.
*H04L 9/30* (2006.01)
*G06F 21/56* (2013.01)
*G06F 21/57* (2013.01)

(52) U.S. Cl.
CPC .......... *G06F 21/577* (2013.01); *G06F 21/565* (2013.01); *G06F 21/575* (2013.01)

(58) Field of Classification Search
None
See application file for complete search history.

(56) References Cited

U.S. PATENT DOCUMENTS

2012/0072968 A1* 3/2012 Wysopal ............... G06F 21/577
                                                           726/1
2021/0173935 A1* 6/2021 Ramasamy ........... G06F 21/577

OTHER PUBLICATIONS

"Reimage," Sharpened Productions, Jan. 19, 2010.
"Reimaging Linux Systems," https:/help.hcltechsw.com/bigfix/9.5/lifecycle/Lifecycle/OSD_Users_Guide/c_imaging_linux.html#:~:text=Reimaging%20Linux%20Systems-.You%20can%20reimage%20Linux%20systems%20by%20deploying%20images%20that%20you.stored%20in%20the%20Image%20Library., HCL Software, Retrieved on Feb. 7, 2023.
"Exif," Wikimedia Foundation, Inc., https://wiki.alquds.edu/?query=Exif, Retrieved on Feb. 7, 2023.

* cited by examiner

*Primary Examiner* — William J. Goodchild
(74) *Attorney, Agent, or Firm* — Weiss & Arons LLP

(57) ABSTRACT

An image analysis security apparatus includes a content delivery network, an image analyzer and a scan engine. The content delivery network receives an image file, quarantines the file and classifies the file with an operating system. The image analyzer receives the file and classifies the file with an image type. The scan engine loads security modules based on the operating system and the image type, communicates with a vulnerability database to receive vulnerability updates, communicates with a cyber threat intelligence database to receive collection analysis relating to unauthorized accesses to data that occurred within a predetermined time period and communicates with an open-source intelligence database to receive public data for intelligence objectives. The scan engine scans and labels the image file using the security modules in tandem with the information received from the databases.

18 Claims, 4 Drawing Sheets

SECURITY VULNERABILITY DETECTION FOR IMAGE FILES

FIELD OF TECHNOLOGY

Aspects of the disclosure relate to image files.

BACKGROUND OF THE DISCLOSURE

Image files are files that include one or more images. Conventionally, image files are heavier—i.e., include substantially more bytes—than typical text files. Because of the weight associated with image files, image files are typically not transferred between devices as often as text files.

Malicious code and/or security threats may be transferred through the communication of one or more other legitimate files. Because image files were not usually transferred between devices, image files were not considered high priority for vulnerability detection. Therefore, minimal security modules have been created to monitor and detect vulnerabilities within image files.

However, recently, because of the processing power associated with current devices, it has become easier to transfer image files from one device to another device. Image files may be transferred from one device to another device within an organization. Image files may also be transferred from a first device, included in a first organization, to a second device, included in a second organization. Image files may also be transferred within a network. Image files may also be transferred from one network to another network.

These image files may contain malicious code embedded in the files. Once the images are opened on a device, the malicious code may cause harm to the device. Therefore, it may be desirable to scan the image files for vulnerabilities prior to enabling the image files to be opened on a device.

SUMMARY OF THE DISCLOSURE

An image analysis security module is provided. The image analysis security module may analyze an image file stored on a computing device. The image analysis security module may also analyze an image file in transit, such as an image file transferred from a transmitter device to a recipient device.

The image analysis security module may be located between a transmitter device and a recipient device. As such, the image analysis security module may be located at a router that is located between the transmitter device and the recipient device. The image analysis security module may be located at the recipient device, and intercept communications prior to the communication being deployed at the recipient device. The image analysis security module may also be located at the transmitter device, and intercept communications prior to being transmitted to other recipients. The image analysis security module may be located at any other suitable location. The image analysis security module may be located at multiple locations.

The image files may be received at a network. The image files may be received in an email, in a chat message, via a webpage, via physical transfer or a portable storage medium from one device to another device or via any other suitable communication method from a transmitter device to one or more recipient devices.

Image files may include one or images. Examples of image files may include bitmap files (.bmp, .dib), JPEG files (.jpeg, .jpg, .jpe, .jfif) files, GIF files (.gif) files, TIFF files (.tif, .tiff), PNG files (.png) and HEIC files (.heic). Image files may also include operating system imaging files. As such, image files may be files used to install an operating system on a hard drive, or update an operating system already stored on a hard drive.

The image analysis security module may quarantine and/or encrypt incoming image files. At times, the encryption may prevent the file from executing executable instructions. As such, an image file that includes a malicious executable may be prevented from performing malicious activity.

The image analysis security module may process the quarantined and/or encrypted one or more image files using a three-step processing system. A first step of the three-step processing system may identify the operating system which created the image file. A second step of the three-step processing system may identify whether the image file is a desktop image, a laptop image, a docker image or a server image. A third step of the three-step processing system may analyze the image. The third step of the three-step processing system may be known as the scan engine. The image may be analyzed for malicious content, unauthorized accounts, image steganography, scanning through metadata and backdoor analysis.

The scan engine may communicate with a vulnerability database to identify current vulnerability threats. The vulnerability database may be a cloud-based service that identifies where a computer system is vulnerable based on a plurality of recent threats and provides solutions to protect the computer system from the plurality of recent threats. The communication between the scan engine and the vulnerability database may involve one or more REpresentational state transfer ("REST") application programming interfaces ("APIs"). The scan engine may communicate with a cyber threat intelligence database and an open-source intelligence database. The cyber threat intelligence database may focus on collecting data relating to current cyber-attacks. The cyber threat intelligence database may also focus on analyzing the collected data. The open-source intelligence database may gather public data for intelligence purposes. The communication between the scan engine and the cyber threat intelligence database and the open-source intelligence database may involve one or more REpresentational state transfer ("REST") application programming interfaces ("APIs").

The scan engine may identify the image as malicious, suspicious or benign. Images that are identified as malicious may trigger an alert that is sent to a first line of a defense team. Images that are identified as suspicious may trigger an alert that is sent to a second line of defense team. Images that are identified as malicious and/or suspicious may be permanently deleted from the quarantine location and/or from any location in which they are stored. The second line of defense team may also be referred to as the red team. Images that are identified as benign may be removed from quarantine and transmitted to the intended recipient.

A report that includes a plurality of scan results may be transmitted to one or more stakeholders. Additionally, the image analysis security module may include a user interface that enables users to view image files and file status, such as malicious, suspicious or benign.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
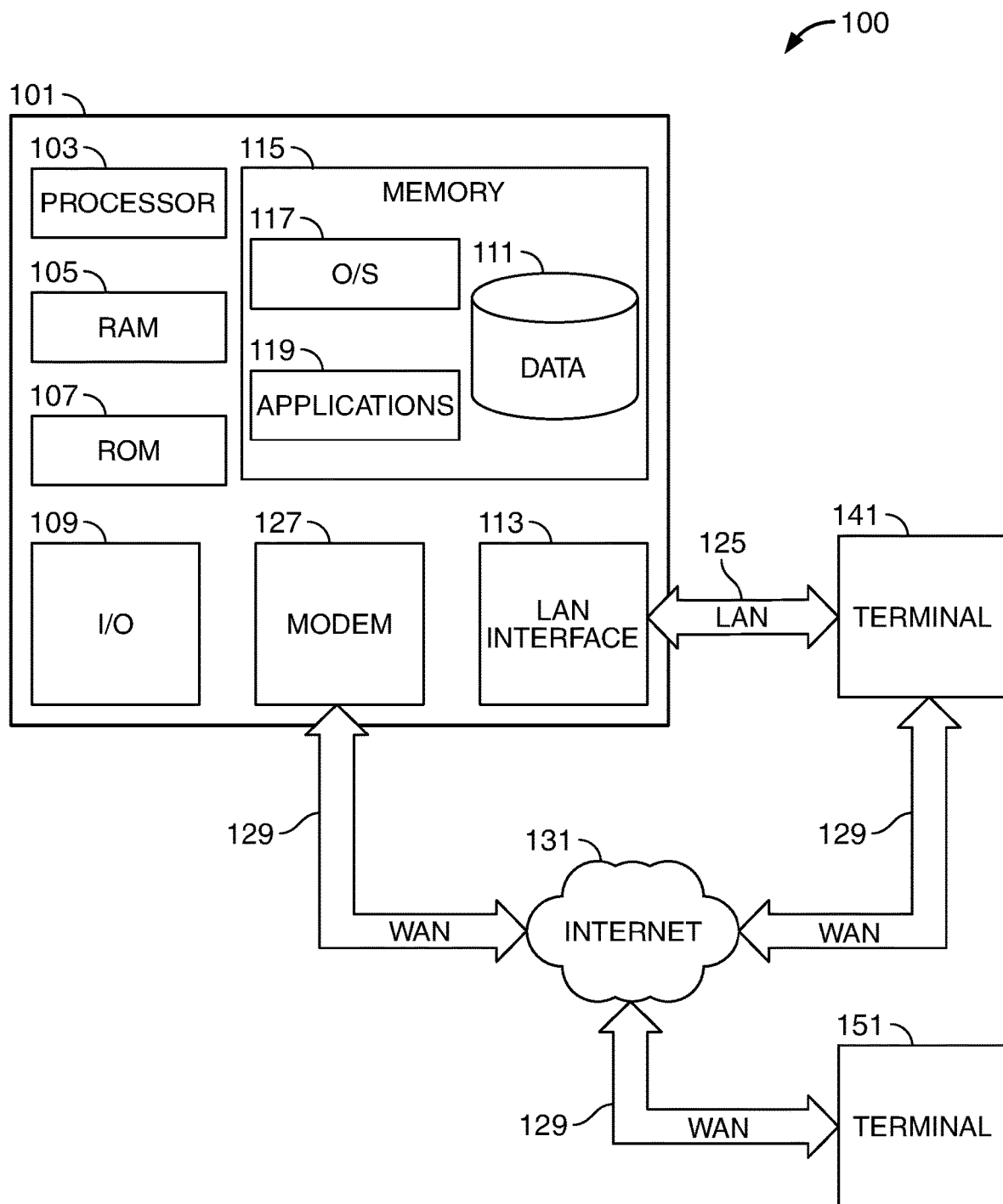
FIG. 1 shows an illustrative diagram in accordance with principles of the disclosure.

Apparatus and methods for analyzing an image file for security vulnerabilities is provided.

The method may include receiving an image file. The image file may be a jpg file, or other such file as described above. The image file may be an image file used to reimage a hard drive of a computing device.

The image file may be transmitted from a first user to a second user. The first user may be included in a first network, while the second user may be included in a second network. The first user and the second user may be included in the same network. The first user may be deploying the image file on a device of the second user. The first user may utilize a source device, also referred to as a source. The second user may utilize a recipient device, also referred to as a recipient. The source may be internal to a network or external to a network.

At times, the method may include intercepting the image file. The intercepting the file may enable scanning of the image file for malicious content prior to transmitting it to, or installing it on, the second device.

The file may be intercepted at a security device. The security device may monitor communications for image files. The security device may be located at a router of network. The security device may be located within each user device. The security device may be located at a vendor security appliance. The vendor security appliance may be located after a device router. The security device may be located at any suitable user device.

At times, the image file may be intercepted at a content delivery network. At times, the image file may be quarantined.

In the event that the image file is received at the second device, the image file may be quarantined at the second device. Such a quarantining may involve encrypting the image file with a hard drive encryption key. As such, the image file may be inaccessible to others until the security scan is completed.

Such quarantining may also involve leaving the image file in an encrypted form. For example, when an image file is received at a hard drive, a hard drive authorization encryption key decrypts the file upon powering ON of the computing device and encrypts the file upon powering OFF of the computing device. However, quarantining the image file may include skipping the decryption when powering OFF of the computing device. As such, the image file may remain in an encrypted state until the completion of the image analysis. After the image analysis, and upon identification that the image file is benign, the method may include decrypting the image file using the hard drive authorization encryption key.

Such an encryption may involve encrypting the image file using a hard drive encryption at a hard drive of the image analysis security apparatus. As such, the image file may be prevented from being accessed by other software or from accessing other software. The image file may be further encrypted using a second encryption algorithm. At times, a hard drive dis-encryption is disabled at a boot prompt of the hard drive in order to ensure that the image file remains encrypted. In certain embodiments, hard drive dis-encryption may be disabled for the image file. It should be noted that remaining files may be encrypted.

The image file may also be quarantined at the content delivery network. Such a quarantining may involve encrypting the image file or placing the image file in a quarantine storage location.

The content delivery network may quarantine the image file with an operating system selected from a plurality of operating systems. The plurality of operating systems may include Windows®, Linux®, Mac® or any other suitable operating systems.

The method may include receiving the image file, classified with an operating system, at an image analyzer.

The method may include classifying the image file with an image type. The image type may be selected from a plurality of image types, such as a desktop image, laptop image, docker image or server image.

The method may include, loading, at a scan engine, one or more security executable files, also referred to herein as security modules. The one or more security executable files may be associated with the operating system and the image type with which the image file was classified. The one or more security executable files may scan the image for one or more vulnerabilities that are specific to the identified operating system and image type. The one or more vulnerabilities may include hidden information. Hidden information may include information that is included within file metadata. The one or more vulnerabilities may include malicious content. Malicious content may be computer code that can present a threat to a computing device.

The one or more vulnerabilities may include unauthorized accounts. Unauthorized account vulnerabilities may include accounts, such as operating system accounts, included within an image file. Such an image file may be used to reimage an operating system. Such an imaging file that may provide unauthorized access to a computing device. The one or more vulnerabilities may include image steganography. Image steganography may include cryptography embedded in image files. The one or more vulnerabilities may include scanning through metadata. Scanning through metadata vulnerabilities may include one or more vulnerabilities included in metadata within an image file. The one or more vulnerabilities may include backdoor analysis. Backdoor analysis vulnerabilities may include vulnerabilities that may be received at a system through a third party, such as a vendor.

The method may include receiving, at the scan engine, from a vulnerability database, vulnerability updates. The vulnerability updates may relate to the operating system and the image type with which the image file was classified.

The method may include receiving, at the scan engine, from a cyber threat intelligence database, a collection of analyzed data relating to unauthorized accesses to data that occurred within a predetermined time period. The collection of analyzed data may be associated with the operating system and image type with which the image file was classified.

The method may include receiving, at the scan engine, from an open-source intelligence database, public data for intelligence objectives. The public data may be associated with the operating system and the image type with which the image file was classified. The one or more vulnerabilities may be compared to the vulnerability updates, the collection analysis and public data to identify whether the vulnerabilities are genuine—i.e., can cause damage to a computer system.

The method may include scanning, at the scan engine, using the one or more security executable files in tandem with the vulnerability updates, the collection of analyzed data and the public data, the image file for hidden information, malicious content, unauthorized accounts and image steganography.

The method may include labeling, at the scan engine, the image file as suspicious, malicious or benign. Suspicious files may be files that have greater than a predetermined possibility of including harmful code. Malicious files are files that include harmful code. Benign file are files that do not include harmful code.

The scan engine may transmit an image file, labeled as suspicious, to a first team. The scan engine may transmit an image file, labeled as malicious, to a defense team. The scan engine may transmit an image file, labeled as benign, to the recipient.

The method may include de-quarantining the image file by decrypting the image file when the file is labeled as benign. The method may include imaging the hard drive with the image file when the image file is labeled as benign.

The scan engine may communicate with an operating system compliance and configuration repository database to transmit compliance and configuration reporting data.

The method may include removing, at the scan engine, detected hidden information, malicious content, unauthorized accounts and image steganography when the image file is labeled as malicious or suspicious. The method may include relabeling, at the scan engine, the image file as benign upon removal of the detected hidden information, malicious content, unauthorized accounts and image steganography. The method may include de-quarantining the image file by decrypting the image file upon removal of the detected hidden information, malicious content, unauthorized accounts and image steganography. The method may include imaging the hard drive with the image file upon removal of the detected hidden information, malicious content, unauthorized accounts and image steganography. The method may also include transferring the image file to the intended recipient when the image file is determined to be benign, or upon removal of the detected hidden information, malicious content, unauthorized accounts and image steganography from the image file.

In some embodiments, the image file may replace a previous image file stored on the hard drive. As such, the process may include a reimaging process. In certain embodiments, the image file may update a previous image file stored on the hard drive. As such, the process may include an image updating process.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may comprise any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to transaction pattern tracking and prediction.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
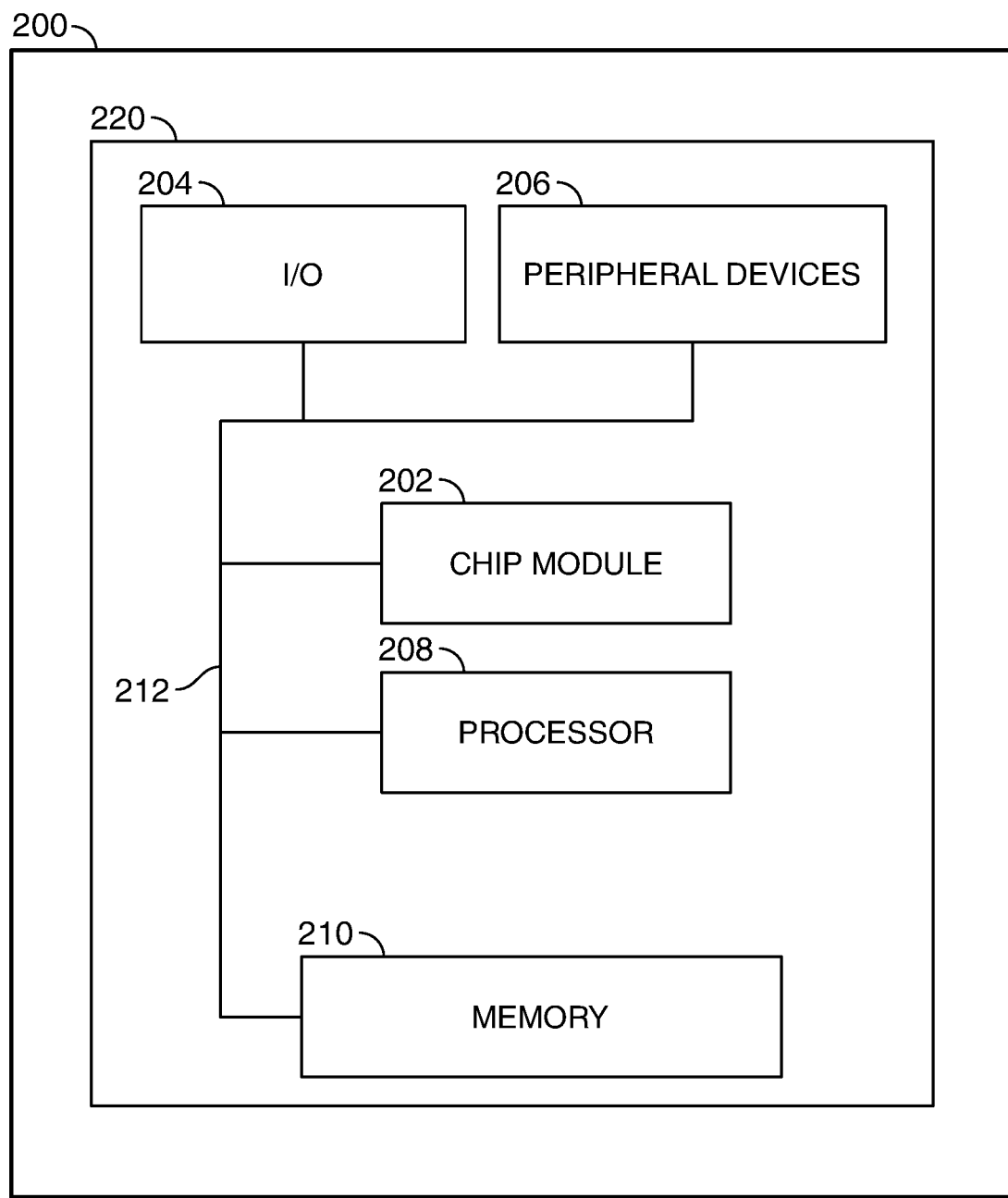
FIG. 2 shows another illustrative diagram in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
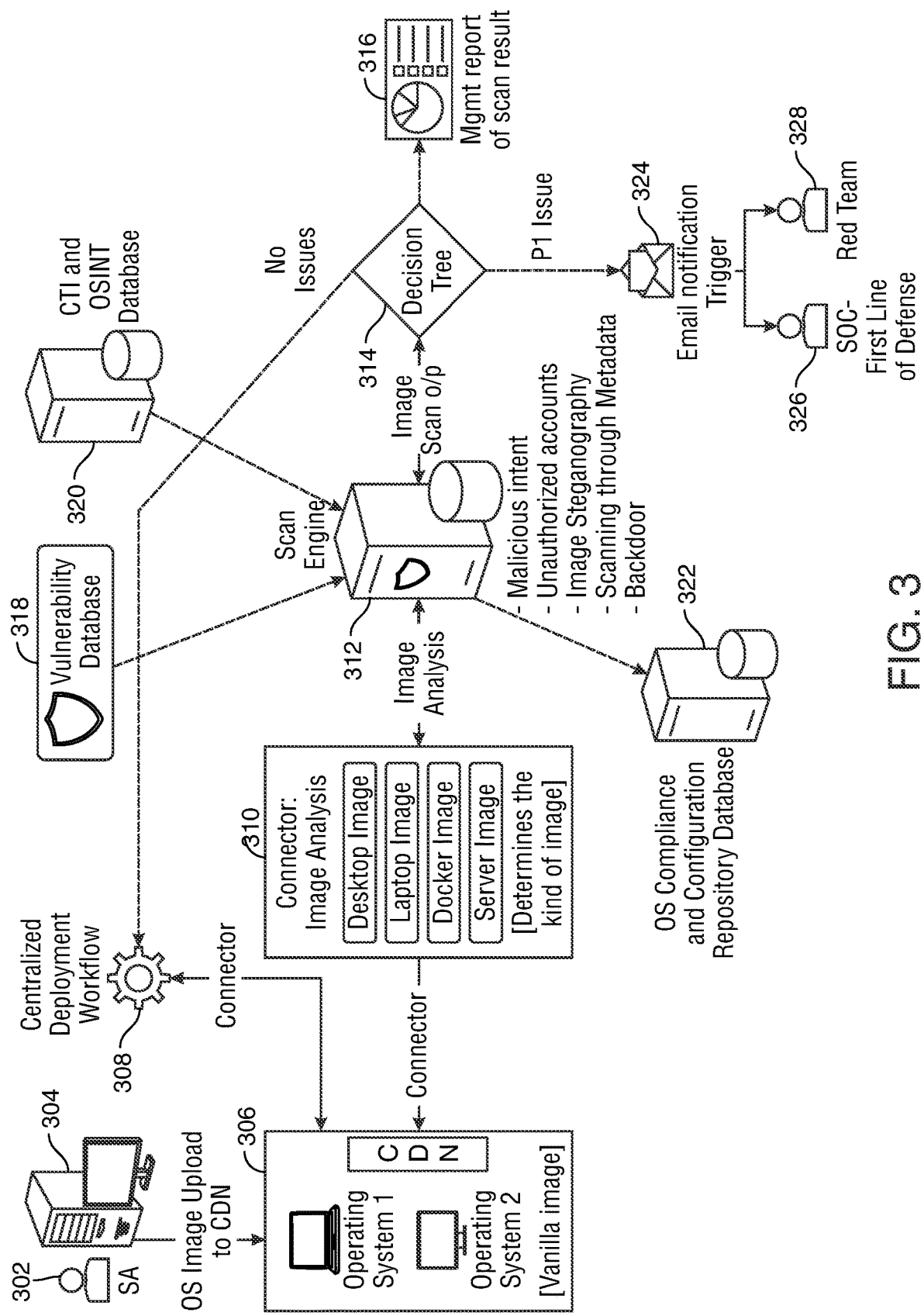
FIG. 3 shows yet another illustrative diagram in accordance with principles of the disclosure.

FIG. 3 shows an illustrative flow diagram. Service Assistant ("SA") 302 may receive, at computer 304, an email message with an image. The operating system residing on computer 304 may upload the image to Content delivery network ("CDN") 306. CDN 306 may include operating system 1 and operating system 2. The operating system that created the image may be selected from CDN 306.

CDN 306 may pass the image-to-image analysis 310. Image analysis 310 may identify an image type for the image. Upon identification of an image type, scan engine 312 may scan the image for malicious intent, unauthorized accounts, image steganography, scanning through metadata and backdoor analysis. Scan engine may communication with vulnerability database 318 and cyber threat intelligence and open-source intelligence database 320 to identify vulnerabilities and threats.

Decision Tree 314 may identify whether the scan is malicious, suspicious or benign. An email notification may be triggered for malicious and suspicious images. Malicious images may be transmitted to the first line of defense, shown at 326. Suspicious images may be transmitted to another team, shown at 328. Benign images may be transmitted back to CDN 306 via a centralized deployment workflow, shown at 308. CDN 306 may transmit the benign images to the originally intended recipient, such as SA 302.

A management report, including the results of the scan, may be generated, as shown at 316.

Figure 4:
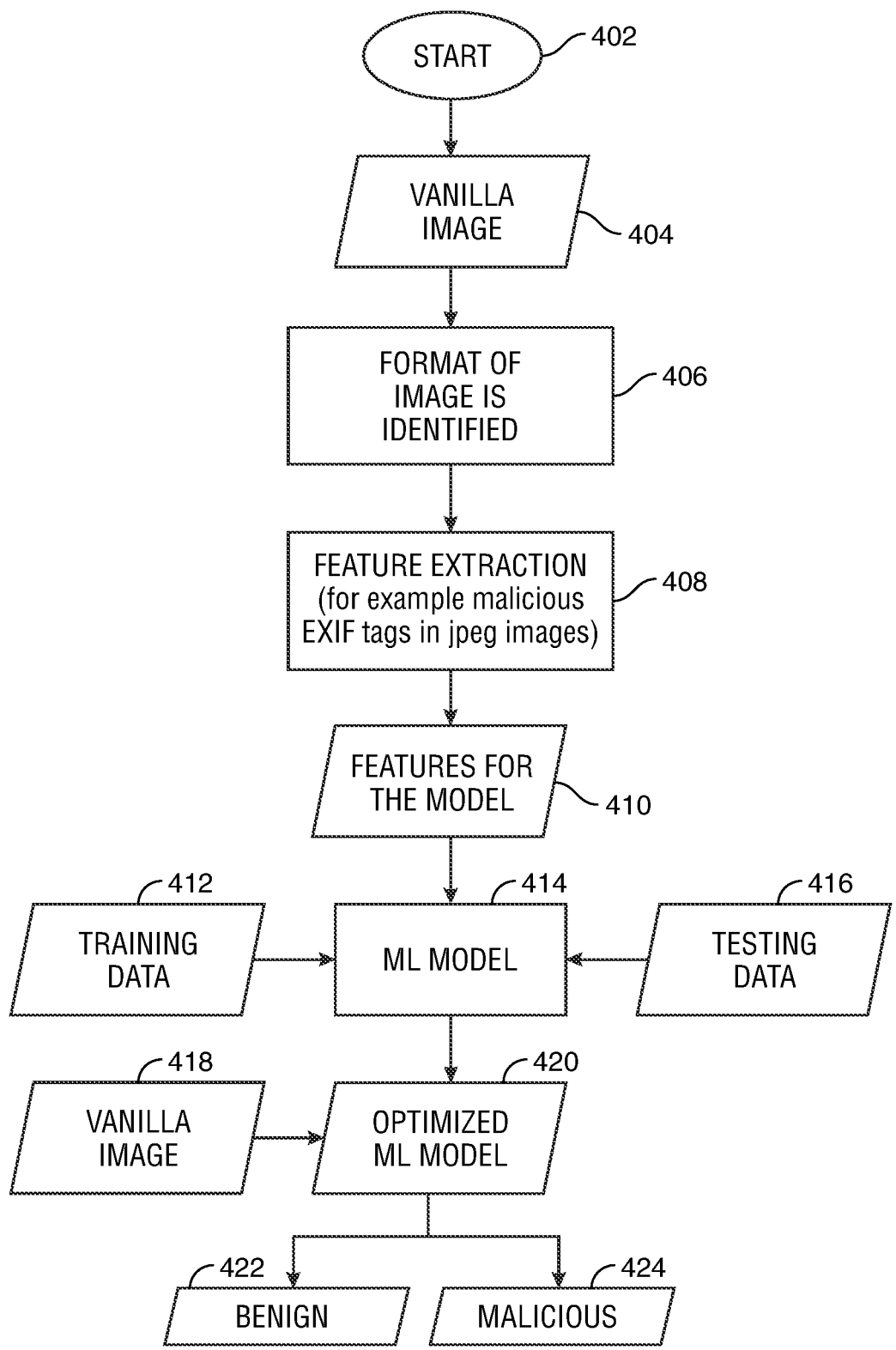
FIG. 4 also shows still another illustrative diagram in accordance with principles of the disclosure.

FIG. 4 shows an illustrative flow chart. The process may start at 402. The operating system associated with an image may be identified, as shown at 404. The format of the image may be identified, as shown at 406.

Features may be extracted from the image. An example of such features may include malicious exchangeable image file format ("EXIF") tags in jpg images, as shown at 408.

EXIF may be a standard that specifies a format for image files and associated image tags, and sound files and associated sound tags. EXIF tags may include metadata relating to the image file or sound file. The metadata may include camera settings, such as, camera model and make, orientation (rotation), aperture, shutter speed, focal length, metering mode and ISO speed information. The metadata may include image metrics, such as, pixel dimensions, resolution, colorspace and filesize. The metadata may include data and time information. The metadata may also include location information. The metadata may also include a thumbnail of the image for previewing the picture of a camera's LCD screen, file managers or in photo manipulation software. The metadata may also include one or more descriptions of the file. The metadata may also include copyright information.

It should be noted that EXIF tags may be exploitable for malicious purposes. A person of malicious intent may embed malicious code within the EXIF tags. As such, extracting malicious EXIF tags from the image files may remove the malicious code from the image file, while retaining the integrity of the image file.

Features for the model may be shown at 410. The features may include a machine learning model, as shown at 414. Both training data, shown at 412 and testing data, shown at 416, may be input into the machine learning model. The machine learning model may be optimized, as shown at 420. The operating system of the image may be input into the optimized machine learning model, as shown at 418. The machine learning model may identify the image as either benign, shown at 422, or malicious, shown at 424.

Thus, systems and methods for security vulnerability detection for image files. Persons skilled in the art will appreciate that the present invention can be practiced by other than the described embodiments, which are presented for purposes of illustration rather than of limitation. The present invention is limited only by the claims that follow.

What is claimed is:

1. An image analysis security apparatus comprising:
   a content delivery network configured to:
      receive an image file from a source, the image file being transmitted from a source to a recipient;
      quarantine the image file;
      classify the image file with an operating system selected from a plurality of operating systems;
   an image analyzer configured to:
      receive the image file from the content delivery network;
      classify the image file with an image type selected from a plurality of image types;
   a scan engine configured to:
      load one or more security modules based on the operating system and the image type;
      communicate with a vulnerability database to receive vulnerability updates for the operating system and the image type;
      communicate with a cyber threat intelligence to receive collection analysis relating to unauthorized accesses to data that occurred within a predetermined time period for the operating system and the image type;
      communicate with an open-source intelligence database to receive public data for intelligence objectives for the operating system and the image type;
      scan, using the one or more security modules in tandem with the vulnerability updates, the collection analysis and the public data, the image file for hidden information, malicious content, unauthorized accounts, image steganography, scanning through metadata and backdoor analysis;
      label, based on the scanning, the image file as suspicious, malicious or benign;
      communicate with an operating system compliance and configuration repository database to transmit compliance and configuration reporting data.

2. The image analysis security apparatus of claim 1 wherein the source is within a network.

3. The image analysis security apparatus of claim 1 wherein the source is external to a network.

4. The image analysis security apparatus of claim 1 wherein the plurality of image types includes a desktop image, a laptop image, a docker imager and a server image.

5. The image analysis security apparatus of claim 1 wherein the plurality of operating systems includes Windows, Mac and Linux.

6. The image analysis security apparatus of claim 1 wherein the scan engine is further configured to:
   label the image file as suspicious; and
   transmit the image file, labeled as suspicious, to a first team.

7. The image analysis security apparatus of claim 1 wherein the scan engine is further configured to:
   label the image file as malicious; and
   transmit the image file, labeled as a malicious, to a defense team.

8. The image analysis security apparatus of claim 1 wherein the scan engine is further configured to:
   label the image file as benign; and
   transmit the image file, labeled as benign, to the recipient.

9. The image analysis security apparatus of claim 1 wherein the vulnerability database is a cloud-based service that identifies where a computer system is vulnerable based on a plurality of recent threats and provides solutions to protect the computer system on the plurality of recent threats.

10. The image analysis security apparatus of claim 1 wherein:
    the one or more security modules scans the image file for one or more vulnerabilities, the one or more vulnerabilities comprising hidden information, malicious content, unauthorized accounts, image steganography, scanning through metadata and backdoor analysis; and
    the one or more vulnerabilities are compared to the vulnerability updates, the collection analysis and public data to identify whether the vulnerabilities are genuine.

11. The image analysis security apparatus of claim 1 wherein the image analysis security apparatus is deployed on a vendor security appliance.

12. The image analysis security apparatus of claim 1 wherein the image file is encrypted using a hard drive encryption at a hard drive of the image analysis security apparatus and is prevented from being accessed by other software or from accessing other software.

13. The image analysis security apparatus of claim 12 wherein the image file is further encrypted using a second encryption algorithm.

14. The image analysis security apparatus of claim 12 wherein a hard drive dis-encryption is disabled at a boot prompt of the hard drive.

15. A method for analyzing an image file for security vulnerabilities, the method comprising:
    intercepting, at a content delivery network, an image file, said image file for imaging a hard drive at a computing device;
    quarantining the image file by encrypting the image file;
    classifying, the content delivery network, the image file with an operating system selected from a plurality of operating systems;

receiving, at an image analyzer, from the content delivery network, the image file;

classifying, at the image analyzer, the image file with an image type selected from a plurality of image types;

loading, at a scan engine, one or more security executable files based on the operating system and the image type;

receiving, at the scan engine, from a vulnerability database, vulnerability updates for the operating system and the image type;

receiving, at the scan engine, from a cyber threat intelligence database, a collection of analyzed data relating to unauthorized accesses to data that occurred within a predetermined time period, the collection of analyzed data being associated with the operating system and image type;

receiving, at the scan engine, from an open-source intelligence database, public data for intelligence objectives, the public data being associated with the operating system and the image type;

scanning, at the scan engine, using the one or more security executable files in tandem with the vulnerability updates, the collection of analyzed data and the public data, the image file for hidden information, malicious content, unauthorized accounts and image steganography;

labeling, at the scan engine, the image file as suspicious, malicious or benign;

de-quarantining the image file by decrypting the image file when the file is labeled as benign; and imaging the hard drive with the image file when the image file is labeled as benign.

16. The method of claim 15 further comprising:

removing, at the scan engine, detected hidden information, malicious content, unauthorized accounts and image steganography when the image file is labeled as malicious or suspicious;

relabeling, at the scan engine, the image file as benign;

de-quarantining the image file by decrypting the image file; and imaging the hard drive with the image file when the image file.

17. The method of claim 15 wherein the image file replaces a previous image file stored on the hard drive.

18. The method of claim 15 wherein the image file updates a previous image file stored on the hard drive.

* * * * *